United States Patent [19]

Pierce et al.

[11] Patent Number: 5,356,296
[45] Date of Patent: Oct. 18, 1994

[54] AUDIO STORYBOOK

[75] Inventors: Harold D. Pierce, 186 Falling Star Ave., Westlake Village; Basil J. Scafidi, Northridge; Bennie L. Garcia, Sylmar, all of Calif.

[73] Assignee: Harold D. Pierce, Westlake Village, Calif.

[21] Appl. No.: 911,155

[22] Filed: Jul. 8, 1992

[51] Int. Cl.⁵ ................................................ G09B 5/00
[52] U.S. Cl. ..................................... 434/317; 434/327; 434/339
[58] Field of Search ............... 434/317, 327, 308, 322, 434/339, 159, 167, 169, 172, 178; 40/446, 453, 455

[56] References Cited

U.S. PATENT DOCUMENTS

| | | |
|---|---|---|
| 1,999,754 | 4/1935 | Evans . |
| 2,546,680 | 3/1951 | Samuels . |
| 2,997,306 | 8/1961 | Hicks . |
| 3,029,683 | 4/1962 | Zaromb . |
| 3,389,636 | 6/1968 | Weitzner et al. . |
| 3,482,842 | 12/1969 | Danielsen et al. . |
| 3,483,655 | 12/1969 | Mason . |
| 3,515,390 | 6/1970 | Ryan et al. . |
| 3,528,627 | 9/1970 | Sindlinger . |
| 3,675,341 | 7/1972 | Matsumoto . |
| 3,748,748 | 7/1973 | Bevan et al. . |
| 3,757,322 | 9/1973 | Barkan et al. . |
| 3,782,734 | 1/1974 | Krainin . |
| 4,028,509 | 6/1977 | Zurcher . |
| 4,066,851 | 1/1978 | White et al. . |
| 4,145,584 | 3/1979 | Otterlei . |
| 4,299,041 | 11/1981 | Wilson . |
| 4,314,114 | 2/1982 | Larson . |
| 4,348,191 | 9/1982 | Lipsitz et al. ........................ 434/308 |
| 4,355,984 | 10/1982 | Slavik et al. . |
| 4,356,358 | 10/1982 | Fukukura . |
| 4,360,716 | 11/1982 | Fiorella . |
| 4,425,484 | 1/1984 | Fukukura . |
| 4,440,990 | 4/1984 | Nozaki . |
| 4,450,324 | 5/1984 | Fukukura et al. . |
| 4,451,714 | 5/1984 | Eventoff . |
| 4,451,911 | 5/1984 | Klose et al. . |
| 4,484,039 | 11/1984 | Salie . |
| 4,493,952 | 1/1985 | Kaleida . |
| 4,498,870 | 2/1985 | Madonna . |
| 4,607,147 | 8/1986 | Ono et al. . |
| 4,623,768 | 11/1986 | Gnant . |
| 4,636,881 | 1/1987 | Brefka et al. . |
| 4,664,634 | 5/1987 | Cutler et al. . |
| 4,703,573 | 11/1987 | Montgomery et al. . |
| 4,752,230 | 6/1988 | Shimizu . |
| 4,809,246 | 2/1989 | Jeng . |
| 4,818,827 | 4/1989 | Ipcinski et al. . |
| 4,884,974 | 12/1989 | DeSmet ............................... 434/317 |
| 4,939,514 | 7/1990 | Miyazaki . |
| 4,990,092 | 2/1991 | Cummings ...................... 40/455 X |
| 5,087,043 | 2/1992 | Billings et al. ................. 434/327 X |
| 5,167,508 | 12/1992 | Mc Taggart ....................... 434/317 |

Primary Examiner—Richard J. Apley
Assistant Examiner—Glenn E. Richman
Attorney, Agent, or Firm—Fulwider Patton Lee and Utecht

[57] ABSTRACT

An audio storybook incorporates raised characters within the storybook which are electronically connected to sound synthesizer and reproduction apparatus associated with a book. The book provides the ability to utilize a progressively revealed pattern in a story, thus improving the ability of such storybooks to accommodate complex story lines and hold the reader's attention.

1 Claim, 8 Drawing Sheets

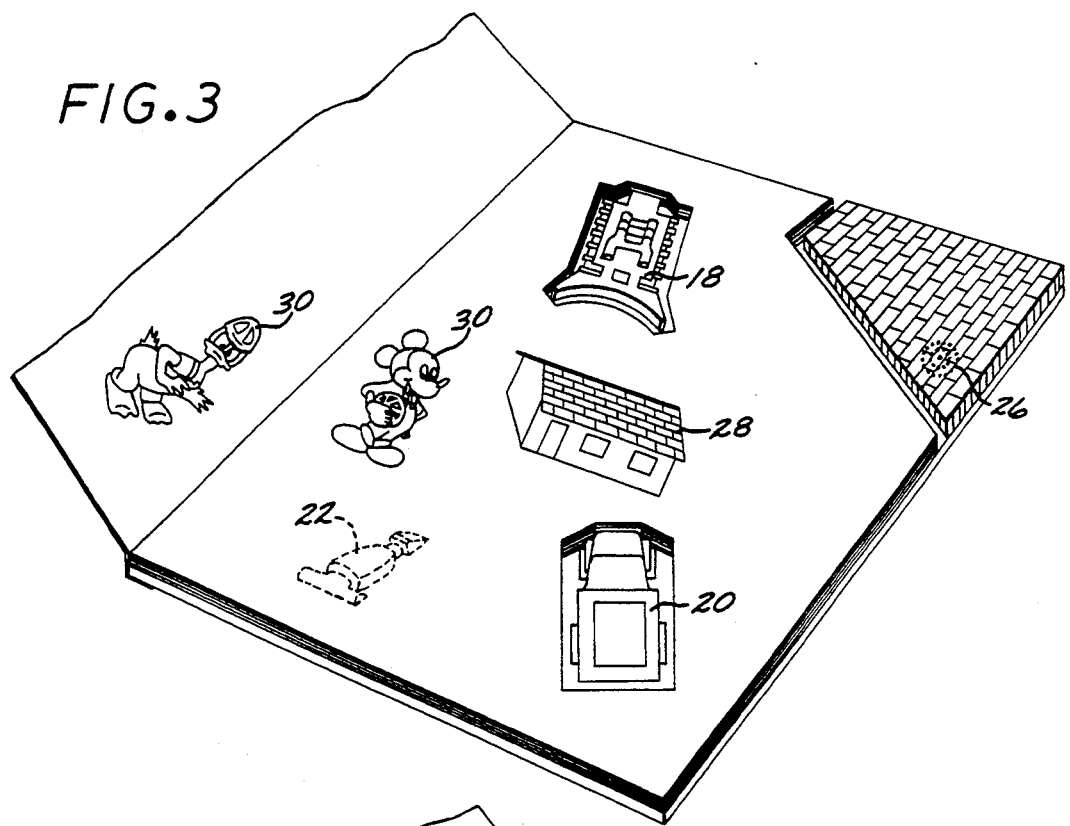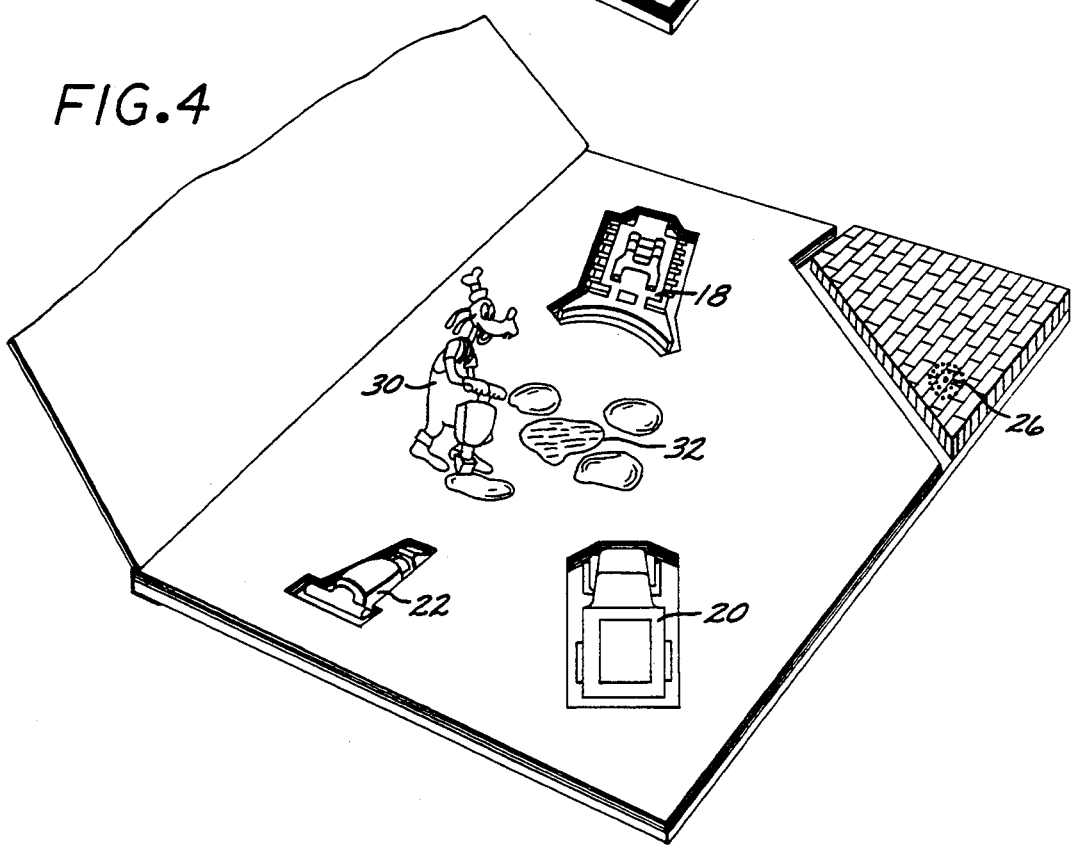

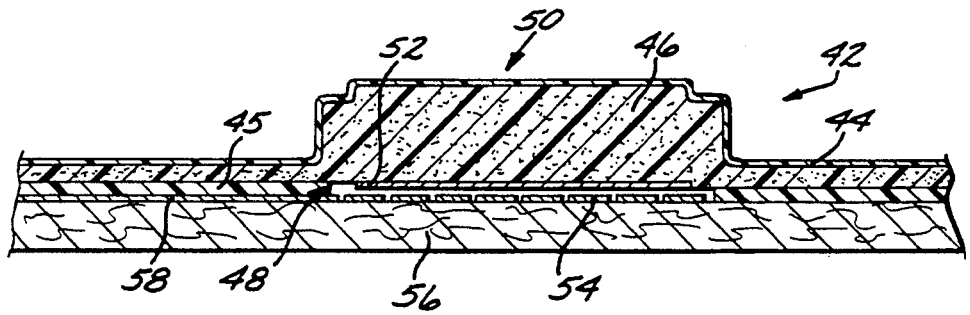
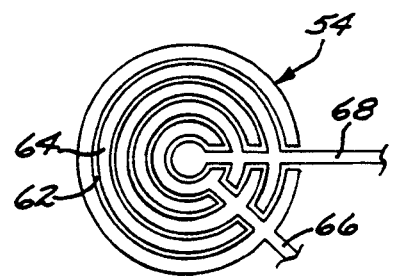
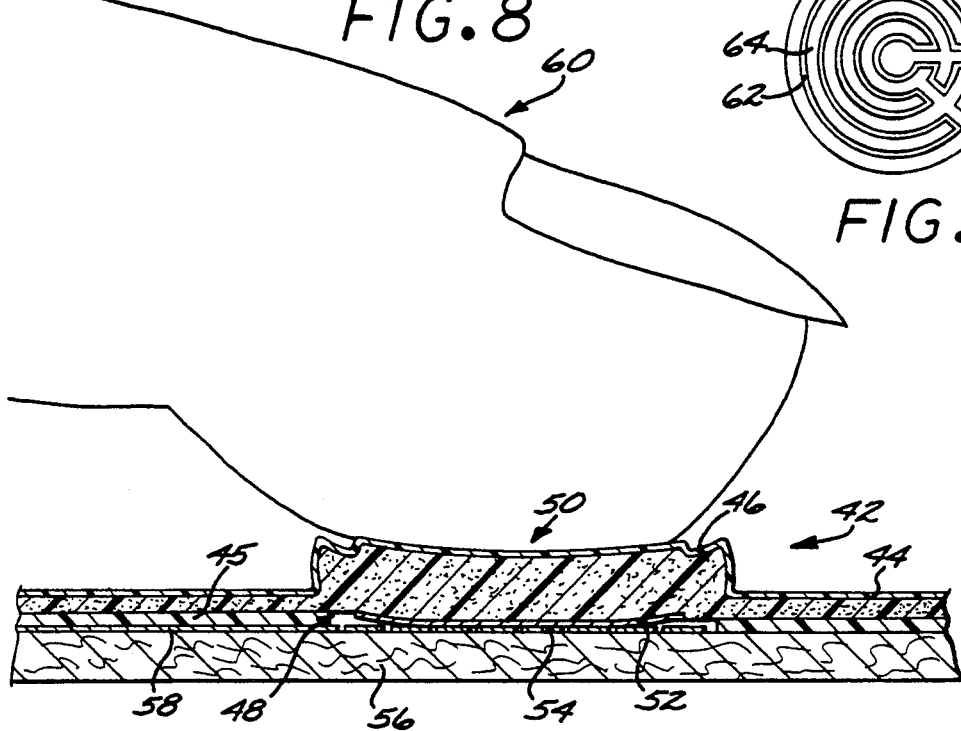
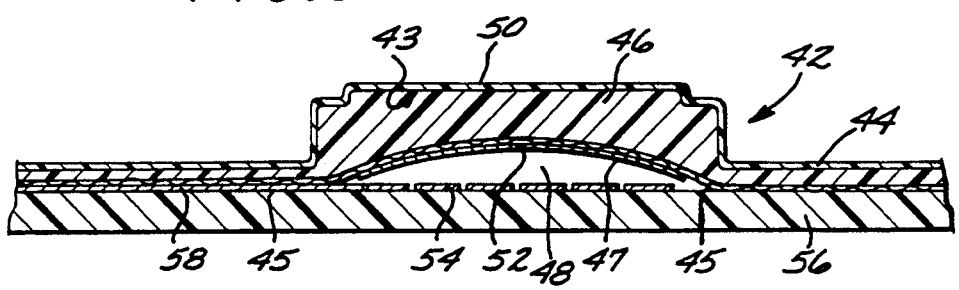

AUDIO STORYBOOK

BACKGROUND OF THE INVENTION

1. Field of the Invention

This invention relates to storybooks which combine audio and visual images, and more particularly to a leaf-type storybook which incorporates audio and visual representations of figures and machines which can be actuated by a reader.

2. Description of the Related Art

It has been known in the art to provide storybooks for the use of children which incorporate images of characters, machines or the like with a corresponding keyboard or touch pad. In the operation of such storybooks, the child turns the pages of the book and upon seeing the character in the text of the story, actuates the corresponding character on the adjacent keyboard to produce an audible representation of the character. For example, a storybook which involves barnyard animals would have pictures within the text corresponding to any reference to a duck or cow and the keyboard located laterally along the side of the storybook would have individual keys with the same image. When the keys are pressed, a circuit to a sound synthesizer is closed which causes an amplifier and speaker within the keyboard to emit a sound of a duck quacking or a cow mooing, as appropriate to the image on the key that was pressed. While such storybooks have been very successful and amusing, and somewhat instructive to the child, they present certain limitations, particularly with regard to the play pattern that is to be used. For example, the keyboard is exposed at all times and thus the characters involved in the story are readily apparent upon first observing or using the book. Also, since the keyboard characters are equally apparent, the child may lose interest after actuating the keys a few times. For these reasons, it is difficult to incorporate a mystery or other suspenseful story into such an arrangement and the child's interest is not easily held by such books. Also, the keyboard provides a flat representation of the figure and for practical reasons it is difficult to materially change the size of the representation. Thus, the presently known formats significantly impact the types and quality of educational and literary works which may be incorporated into such books. For these reasons it would be advantageous if an audio visual storybook could be configured that included the ability to expand the possibilities for providing story lines to a child which heighten the child's anticipation and hold the child's interest.

SUMMARY OF THE INVENTION

The present invention is designed to substantially enhance and augment the ability of an author to present story lines in which characters, machines or events and the like are not revealed to the reader until the appropriate time in the story. The invention accomplishes this desirable goal by "progressively revealing" audio/visual characters which are incorporated into the pages of a book. In practice, one or more pages of a book according to the invention incorporate representations of characters which may be embossed or otherwise three-dimensionalized in order to enhance their appeal and/or realism. Each of the characters is connected to a circuit within the page of the book and is also connected to an associated sound synthesizer, so that when the character is pressed, a sound appropriate to the character is emitted. The preceding pages of the book are configured to include cutouts for the various character representations in the appropriate spot so that as the book pages are turned, new characters are progressively revealed to the reader. In a presently preferred embodiment of the invention, all of the characters are finally revealed on one of the final pages of the book, and each of the characters is represented by a raised figure that is pressed by the reader to cause the appropriate audio response. The use of the invention has been shown to greatly increase the attention-holding capabilities of such books for young children. This play pattern is particularly advantageous for suspenseful or mysterious plots, but is appropriate and desirable for any story telling function incorporating graphic depictions of characters or the like.

The invention has many advantages as an educational and entertainment tool for children. One such advantage is that the child is not tempted into merely actuating the keys at random to cause the noises to be emitted, but is led through the story as a means of revealing the characters. Also, a book according to the invention is more compact and thus conventional in appearance compared to storybooks with attached keyboards, thereby enhancing the appearance and acceptability of the book and leading the child to early acceptance of a book without the audio visual features. The invention also is a means of providing a more realistic three dimensional representation of certain characters, thus enhancing the child's recognition of understanding the nature of the character or machine. Also, such a configuration increases the enjoyment of the story due to the positive tactile feedback of operating the three dimensional keys. While the invention is described in the context of a leafed book, those skilled in the art will recognize that the invention can be incorporated in other audio visual works which incorporate the invention and obtain the advantages of the inventive concepts presented herein.

In a presently preferred embodiment, the invention is incorporated in a multiple page book. One or more of the final pages is die cut to provide for recessed graphic depictions of characters which are formed of foam between layers of sheet polyvinyl chloride, polyethylene, embossed paper or the like. The sheets of plastic, with the foam therebetween, are formed in a die under pressure and/or heat to create the graphic depictions in relief. Beneath each graphic depiction is a slight recess into which a quantity of conductive ink is deposited. Incorporated into the die cut area beneath the sheets is a conductive contact and associated circuitry to complete a circuit to an associated sound synthesizer which creates an appropriate sound when the circuit is closed by the reader depressing the graphic representation, thereby closing the circuit to the sound synthesizer and associated amplification and sound emitting apparatus.

An important aspect of the invention is the construction of the pages which incorporate the graphic representation of the characters and the methods of incorporating them into an assembled storybook. This construction, in a presently preferred embodiment, was created to provide a visually attractive and economical product that is highly reliable and marketable. In a preferred embodiment, the pages are formed by imprinting, in a multi-color reverse process, the graphics and text on a plastic sheet used to form a top surface, thus providing abrasion resistance and long life for the colors and graphics. A top sheet is then vacuum moulded to form the raised characters and is left in the mould for the foaming process. The foam is formed between the moulded plastic sheet and a second sheet which is preferably a paper layer embossed with convex areas corresponding to the images in the plastic sheet. A conductive ink is printed into the concave areas. After the foam has been formed between the sheets, the foam sandwich is overlaid over a mating base plate which has circuits corresponding to the locations of the characters and connecting the characters to an electronics and sound module incorporated into the base plate. Such an assembly can then constitute one or more pages of the book.

The sound synthesizer, in order to save batteries, is designed to incorporate a "sleep mode" in which essentially no current is drawn until the contact between the terminals beneath the graphic depiction is closed. Once contact is made, the circuit "wakes up" to poll the inputs and determines which sound should be emitted. The appropriate sound signal is then amplified and emitted through an associated speaker.

The storybook may incorporate a plurality of pages which can have cut-outs corresponding to the graphic depictions so that the graphic depictions are progressively revealed at the appropriate point in the story. Additionally, one or more of the intermediate pages may be configured like the final pages described above to allow for new patterns of progressive revelation of graphic depictions as the story unfolds. By use of this technique, the storybook has great attention-holding capabilities which are particularly advantageous for younger children or complex stories. Those skilled in the art will recognize that the invention can also be of benefit when applied to educational or game playing scenarios, and, in fact, any environment in which it is desirable to cause a graphic depiction to produce the appropriate response while it is progressively revealed in the course of telling a story, playing a game or the like.

From the above, it will be evident that the present invention provides important benefits to those wishing to configure audio visual works for children, particularly if it is important that the work have powerful attention retaining capabilities with younger children. Other features and benefits of the invention will be apparent to those skilled in the art from the accompanying drawings and detailed description which illustrate, by way of example, the features of the invention.

BRIEF DESCRIPTION OF THE DRAWINGS

FIG. 3 is a perspective of a book according to the invention open to an intermediate page.

FIG. 4 is a section of the book opened to a later intermediate page.

FIG. 7 is a cross section of a graphic depiction incorporated into the last page.

FIG. 8 is a depiction of the closing of a circuit as the graphic depiction is depressed by the reader's finger.

FIG. 9 illustrates an alternative construction of a laminate for a final page.

FIG. 10 is a vertical view of the terminal arrangement beneath the graphic depiction.

DESCRIPTION OF THE PREFERRED EMBODIMENT

The present invention is embodied in a book or the like which can be opened and read in the normal manner and which also incorporates representations of characters or machines and the like which are progressively revealed by the reader. Thus, the invention lends itself to complex story lines, thereby enhancing the enjoyment and educational value to the reader. Additionally, the "progressive reveal" nature of the invention can be used to retain the attention of a young or distracted reader.

Figure 1:
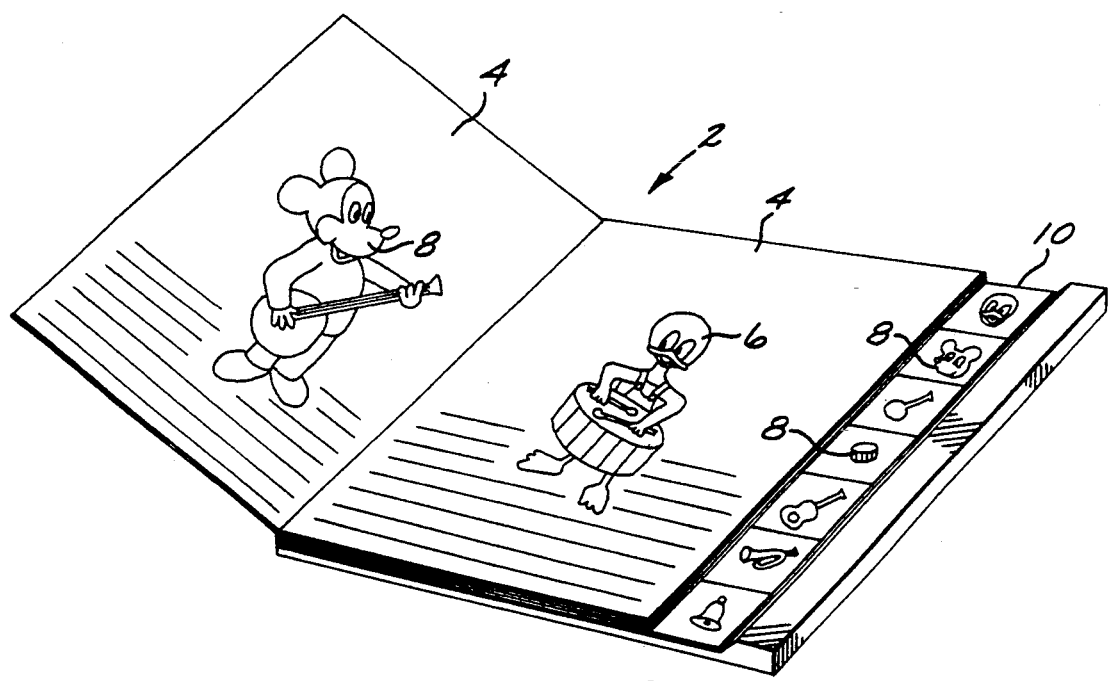
FIG. 1 is a perspective view of a sound storybook of the prior art.

FIG. 1 illustrates a sound storybook 2 of the prior art. In such an arrangement, the pages 4 contain illustrations 6 which correspond to FIGS. 8 on an adjacent keyboard 10. When the operator wishes to cause a sound to be heard corresponding to the figure on the page, he presses the appropriate figure on the keyboard, which closes a circuit and then causes an appropriate sound to be emitted by a sound synthesizer and associated amplifier and speaker. It can be readily seen that such an arrangement does little to increase the curiosity of the reader, since all characters are readily apparent when one first uses the book. Thus, there is little interest holding capability for such a book, particularly when the reader is a young child or easily distracted. The book is also clumsy and relatively unattractive, since the side keyboard and electronics are outside of the normal book and lack apparent integration into the book.

Figure 2:
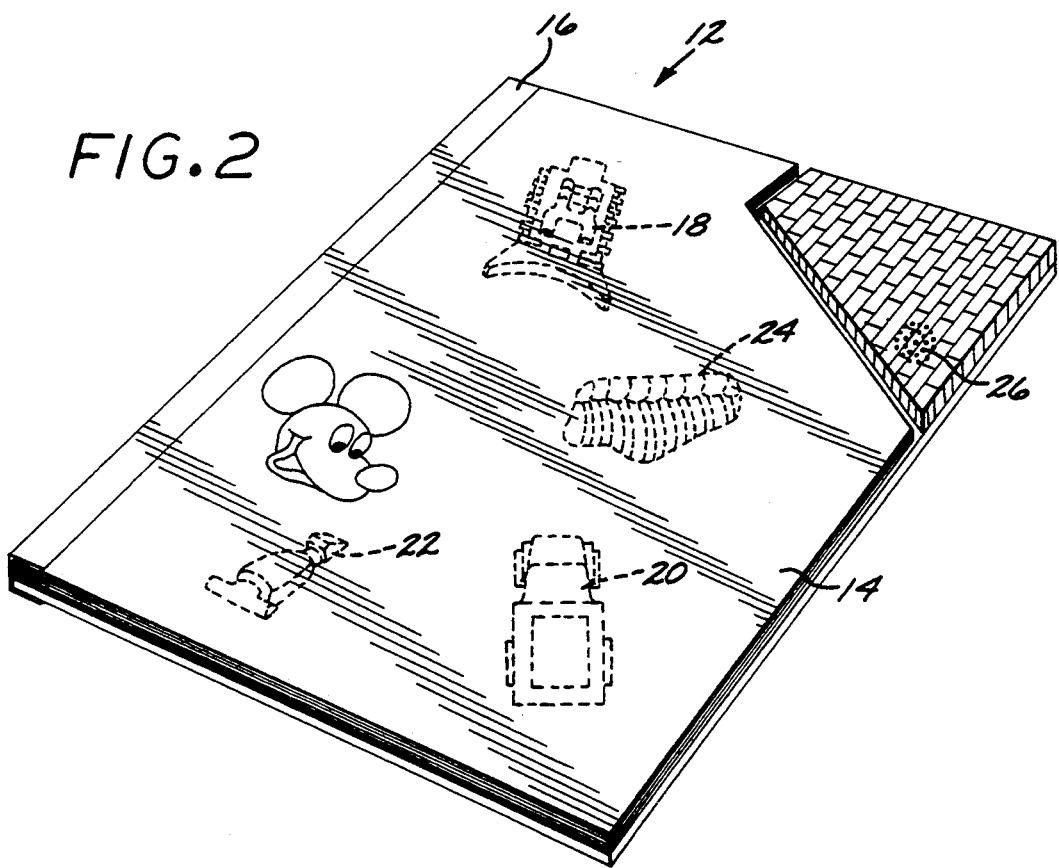
FIG. 2 is a cutaway schematic representation of the present invention, illustrating the graphic depictions incorporated into the final page in phantom.

Referring to FIG. 2, the sound storybook of the invention 12 incorporates a number of pages 14 which are bound at hinge 16. In operation, the reader leafs open the pages of the book and finds that graphic depictions of the characters, machines or the like are revealed in their proper place in the text as one reads through the book. In FIG. 2 four separate characterizations are represented as 18, 20, 22 and 24 in positions where they are progressively revealed by the story line as the book is read. When the reader presses on any of the appropriate characters 18, 20, 22 or 24, a circuit is closed which causes a sound synthesizer to emit from speaker 26, a sound associated with the character being pressed. In practice, it has been found advantageous to "theme" the electronics and speaker package into the book to present a more attractive and effective package. In this particular embodiment, the electronics and speaker are themed as a tool shed at a construction site. The electronics to accomplish this sound synthesis and amplification are contained in an electronics package (not shown) incorporated in the book.

FIG. 3 illustrates a book according to the invention open to an early intermediate page in the story. In this case, a graphic depiction of a bulldozer 18 and a truck 20 are shown at a construction site where house 28 is to be demolished by workers 30. Jackhammer 22 (shown in phantom) is incorporated in a page that is still beneath this page and has not yet been revealed.

FIG. 4 illustrates a later stage of the story in which the previously hidden jackhammer depiction 22 is revealed and available for actuation by the reader. The place where house 28 previously stood is now represented by the construction site 32 where the workman 30 works with the jackhammer 22.

Figure 5:
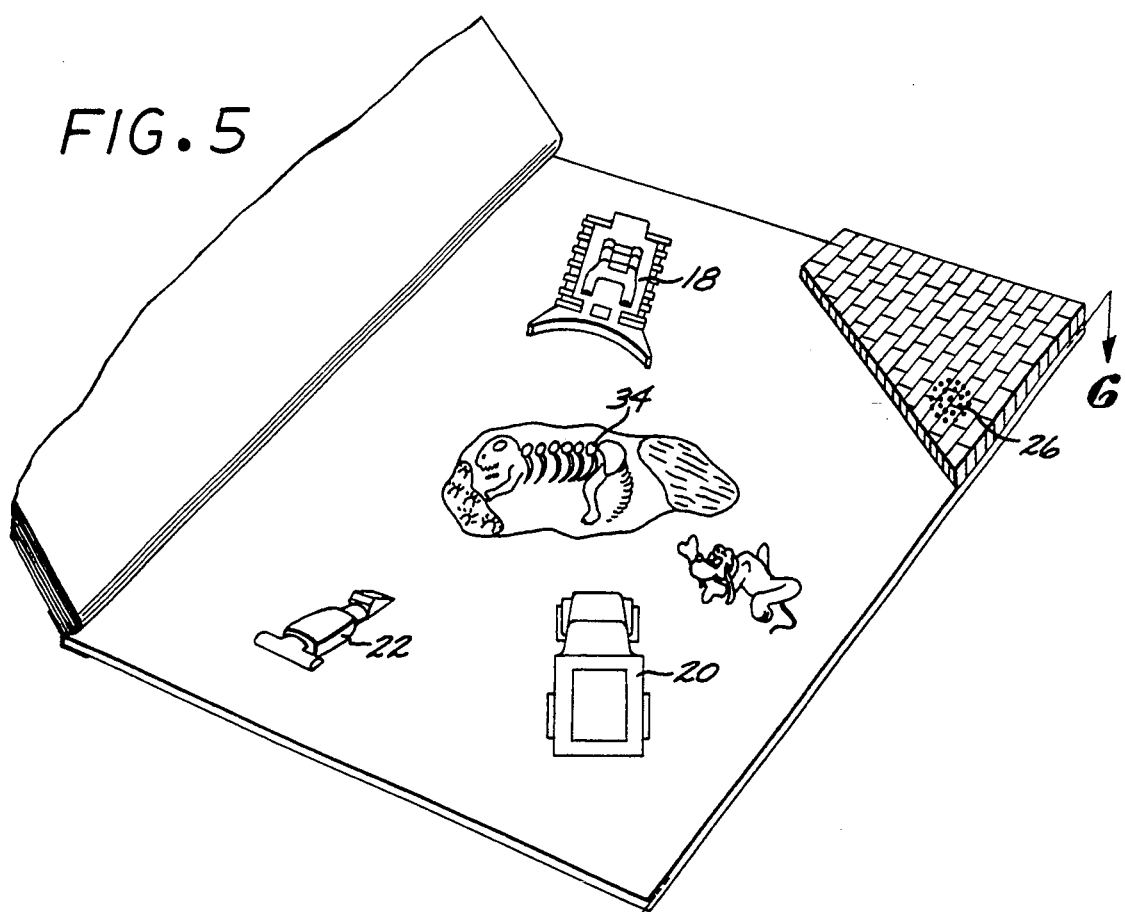
FIG. 5 is a section of the book opened to the last page.

FIG. 5 illustrates the final page of the book in which all of the elements of the story are revealed, including the bulldozer 18, the truck 20, the jackhammer 22 and finally a dinosaur skeleton in the construction site 34. From the illustrations of FIGS. 2-5, it can be seen that the present invention provides a very attractive and effective means of telling a story which is likely to both entertain and hold the attention of the reader.

Figure 6:
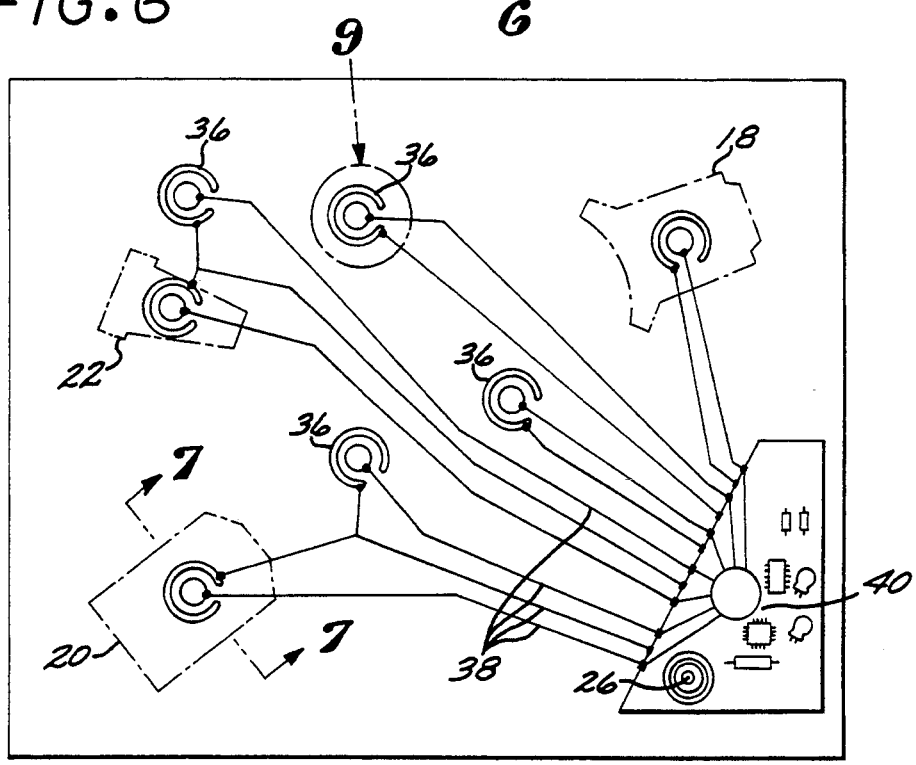
FIG. 6 is a cutaway schematic of the final page of the book, illustrating the circuits between the graphic depictions and the sound synthesizer.

FIG. 6 is a section at 6—6 of FIG. 5 and illustrates the arrangement of various circuits between the characters 18, 20, 22 and 24 and other representations 36 embedded within the book. In each case, a push button or other switch within the character is connected to a wiring harness 38 or the like leading to electronics package 40, wherein the sound synthesis for the character and its amplification for feeding the speaker is accomplished.

FIG. 7 illustrates one embodiment of the cross section 7—7 of the graphic depiction 20 of FIG. 6, showing that the bottom page 42 incorporates a layer of print media 44 overlaying a resilient foam layer 46 which may be raised to represent a character to be displayed. Laminated backing layer 56 is used to provide stiffness for the back of the book in order to avoid unwanted deflection during the reader's pressing of the characters.

In practice, it has been found that layer 44 is advantageously made of polyethylene or polyvinylchloride (PVC), with resilient layer 46 formed of a foam compatible with layer 44. Because of the greater number of compatible printing processes available, PVC is a presently preferred material for layer 44.

FIG. 8 illustrates the operation of the graphic representation 50 during which the reader's finger 60 presses on graphic representation 50, causing upper conductive layer 52 to come in contact with lower conductive layer 54, thereby completing a circuit to the sound synthesizer.

FIG. 9 illustrates a presently preferred embodiment of the page laminate 42. In constructing such a laminate, a top sheet 44 is made of polyvinylchloride or other suitable material that can be reverse printed with graphics on surface 43 on the inside of the sheet. A bottom sheet 45 is made of embossed paper with an embossed area 47 corresponding to a character printed on area 43. Foam 46 is formed between the sheets using heat and pressure to create the sheet sandwich 42. A conductive ink 52 is deposited on the paper 45 in cavity 48 and makes contact with an underlying conductive pattern 54 deposited on base plate 56. Conductive pattern 54 is connected to external electronics by conductors 58. In practice, it has been found that a conductive ink is suitable for conductive patterns 52, 54 and 58.

The final page of the book 42 is formed with die cut openings 48 corresponding to the raised graphic representation 50. A layer of conductive ink 52 is deposited on the bottom of the graphic representation and mates with a similar area of conductive area 54 on a relatively rigid base plate 56 forming the bottom surface of the final page. An extension of the conductive layer 58 in the bottom of the die cut opening 48 connects conductive area 54 with an external circuit.

FIG. 10 illustrates one preferred form of the conductive layer 54 in which two concentric conductive paths 62, 64, are connected to respective external conductors 66, 68. When conductive layer area 52 comes in contact with paths 62, 64 of layer 54, the circuit is completed, thus activating the sound synthesizer circuit.

Figure 11:
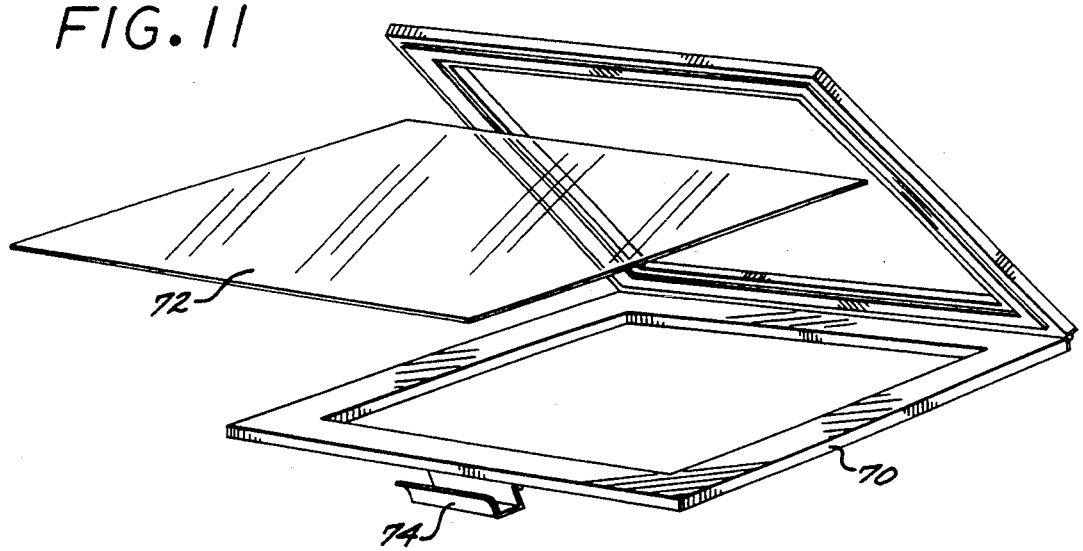
FIG. 11 is a perspective view of the alignment frame.

In another preferred embodiment of the present invention, a vacuum formed process for forming the active sheets of the book is illustrated in FIGS. 8-16. Referring to FIG. 11, an alignment frame 70 provides means to align within a vacuum form machine the various components of the active page. In the process of forming the active page, a clear flexible plastic film or sheet 72 ranging from approximately 3-4 thousands thick will be multi-color reverse process printed using an ink compatible with the plastic and which is moderately flexible and temperature tolerant. One such ink which is especially good for this process is a so-called "hard dry", oil base type ink. By reverse printing, the sheet overlaying the character is made much more resistant to wear and abuse, thus prolonging the life and attractiveness of the active page.

Figure 16:
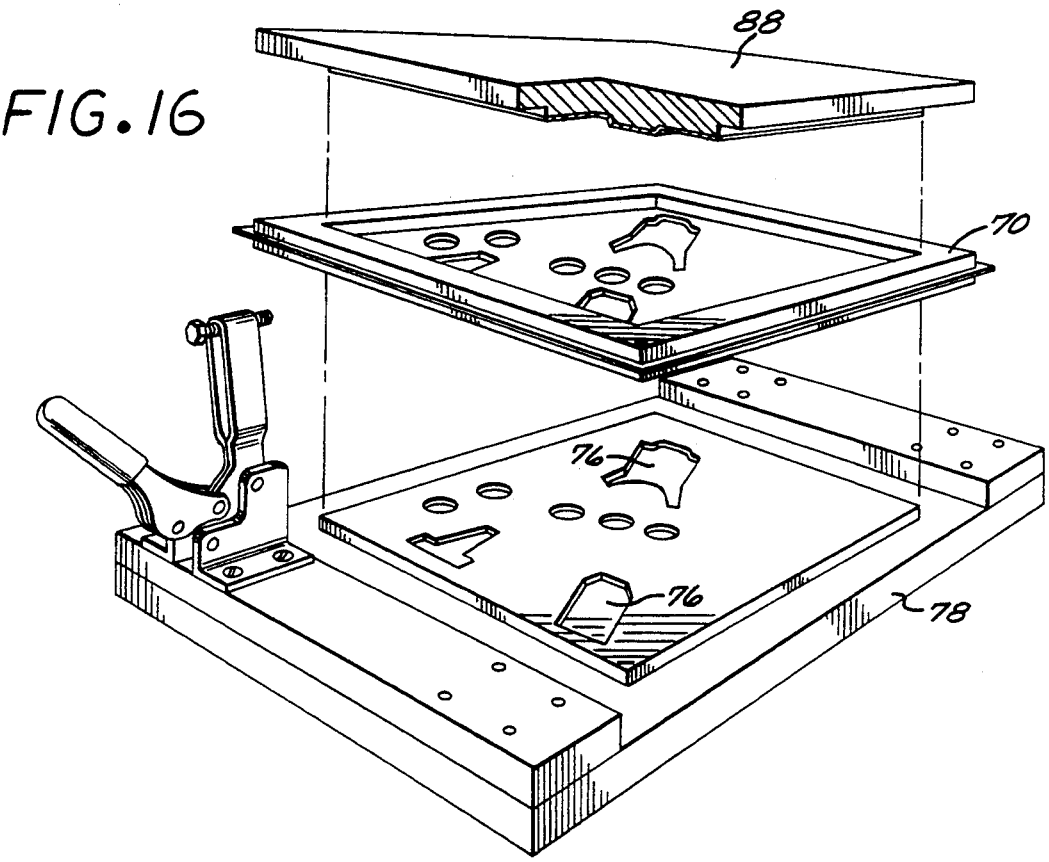
FIG. 16 is an exploded view of the moulding tableframe assembly used for forming the page of a sound story book.

After the plastic sheet is reverse printed, it is placed into the alignment frame 70 in order to keep it from folding or wrinkling. Alignment lines are printed as part of the reverse printing process and are used to line up the plastic in a vacuum form mould. The alignment frame includes clamps or springs 74 and the gasket which holds the frame tightly to the sheet. The vacuum form mould illustrated in FIG. 16 is made with concave images which are representations of the characters to be formed in the sheet overlying the reverse printing. After the vacuum frame is placed on the vacuum mould, the entire assembly is placed on top of a vacuum forming table 78.

Figure 13:
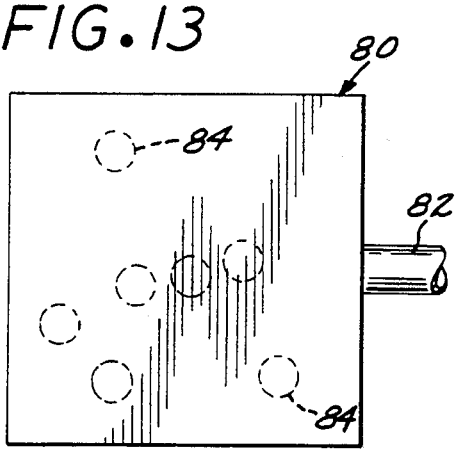
FIG. 13 is a top view of the vacuum table fixture.
Figure 15:
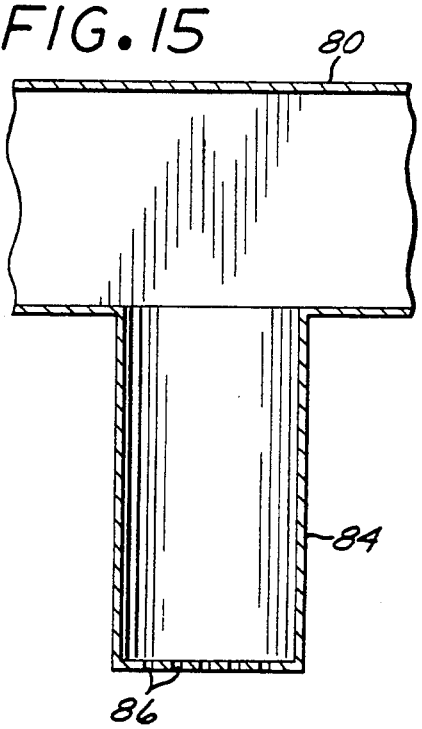
FIG. 15 is a side sectional view at 15—15 of FIG. 14.
Figure 14:
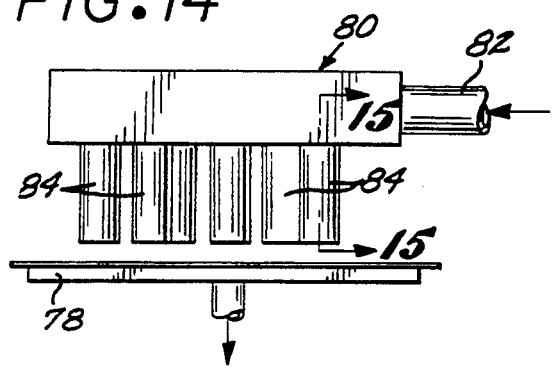
FIG. 14 is a side view of the vacuum table fixture.

FIG. 13 illustrates the arrangement of the vacuum forming and heating assemblies. Hot air system 80, shown in top view in FIG. 13, is hollow to allow hot air to enter via inlet 82 to various outlet ports 84 located over the areas to be formed in the page. Hot air is then exhausted through outlet orifices 86 shown in FIG. 15 to locally heat the plastic placed over vacuum table 78. The areas of the PVC film to be vacuum formed will be heated, preferably by hot air at a temperature from 145°-165° C. The heating is done in a localized area in order to avoid distortion of the remaining parts of the film in which representations of characters are not formed. After heating, a vacuum is applied to the vacuum form mould and the plastic sheet is drawn into the embossed areas of the mould 76. A heat source is then removed and the plastic is allowed to cool for approximately 20 seconds after which the vacuum is removed and the plastic sheet is ready for the next step of the process. The urethane foam layer is formed in the same mould used for vacuum forming. To accomplish this, the mould is removed from the vacuum table and taken to a urethane foam station. There a primer coat is placed on the back of the plastic sheet. In a preferred embodiment Swift brand "Fome-Bond" adhesive is used, while in other cases an ink which is formulated to bond the urethane foam may be used. Thereafter the two part urethane foam liquid is poured on top of the plastic film and vacuum form mould. In a currently preferred embodiment a BJB urethane foam part number TC274 is used.

After the foam is poured into the form a bottom layer is placed over the mould. In a currently preferred embodiment, the bottom layer is made of paper and has a thickness of approximately twenty thousands. The paper is printed with a conductive ink in shapes corresponding to the active areas of the page. In a currently preferred embodiment an index-type paper is coated with a Acheson JEF-010 type conductive ink, and the images are embossed to give them a convex contour prior to formation of the foam. After the bottom page is inserted into the mould assembly it is covered with an embossed cover plate 88, clamped, and allowed to cure with the urethane foam typically curing in the mould within 5-8 minutes. If a faster cure is desired the mould and cover plate can be warmed to a higher temperature, e.g. 180° F.

Figure 12:
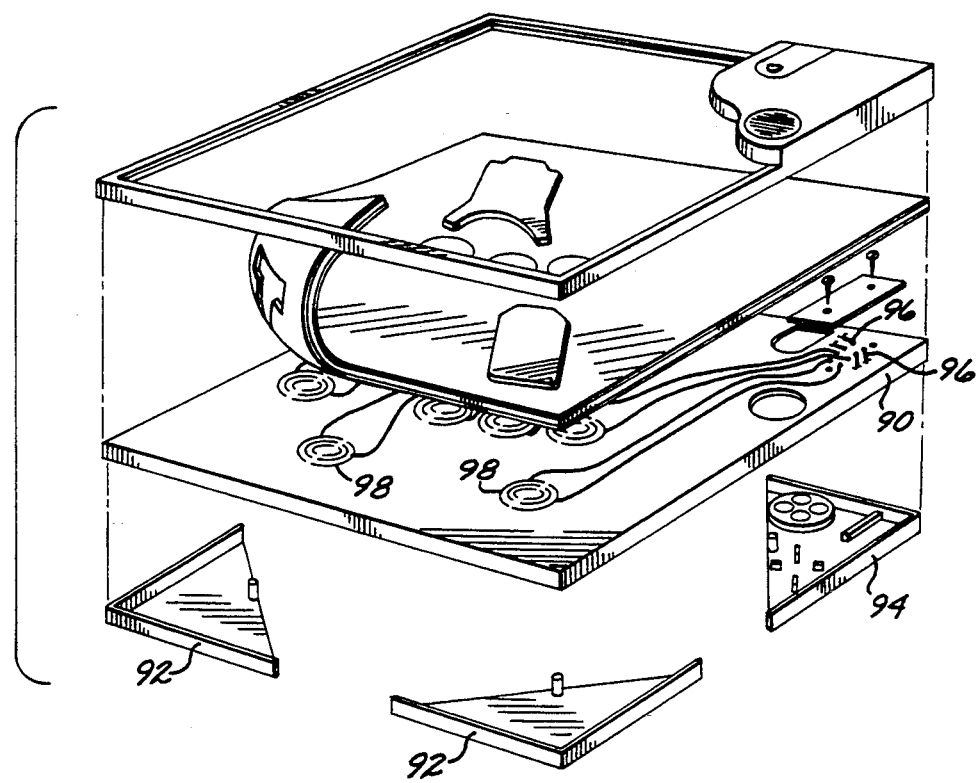
FIG. 12 is an exploded view of a final page of the sound storybook.

After the urethane foam is cured, the plastic foam paper laminate can be removed and trimmed to the proper size and is ready to be assembled to the plastic tray 90 as shown in FIG. 12. Plastic tray 90 is designed to support the laminate and provide an acoustic air space for the sound unit. The acoustic air space acts as an audio resonator and provides lower frequency response and higher audio output compared to previously known structures. Furthermore, the assembly of a tray on the bottom of the active page provides structural and aesthetic benefits for the book. The outside surface of the plastic tray is silk screened with a specific pattern of conductive ink such as JEF 010. Four plastic triangles 92 are then bonded into the bottom of the tray to provide structural support and also provide a larger bonding surface area for the final book to plastic tray assembly step. Also, the upper right plastic triangle 94 is designed to hold the speaker and the battery compartment for the electronics. After the triangles are inserted, a printed circuit board is mounted into the top of the tray and is designed with compressible electric contacts 96 which form an electrical connection with the tray conductive ink pattern 98 as the tray is assembled. Thereafter, the plastic laminate sheet forming the bottom page 42 is attached to the top of the plastic tray. The frame then acts as a bezel and as a mechanical clamp for the plastic sheet edges when it is snapped over the tray plastic sheet assembly.

Figure 17:
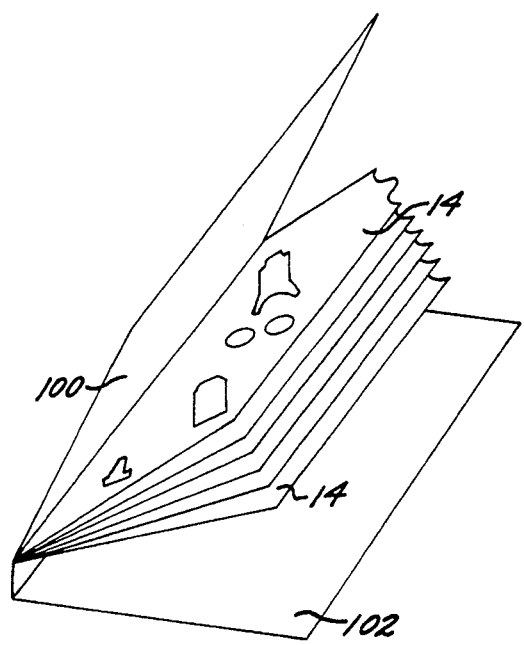
FIG. 17 illustrates the non-active pages of the book and covers prior to assembly.
Figure 18:
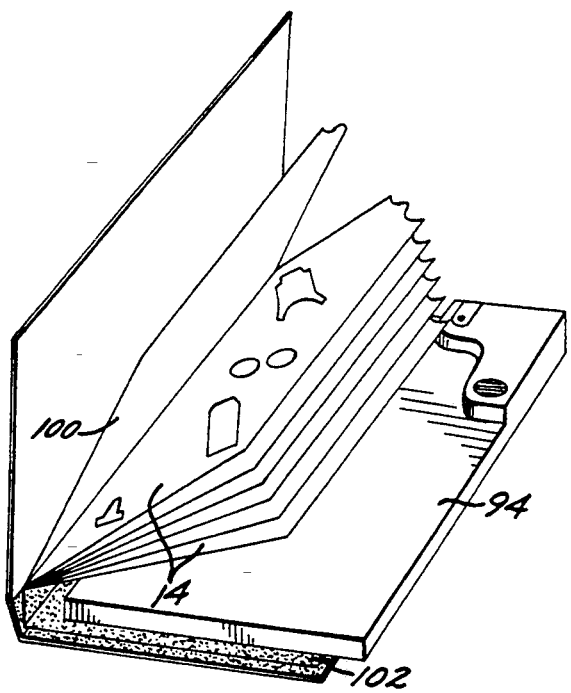
FIG. 18 illustrates the book being assembled with an active final page.
Figure 19:
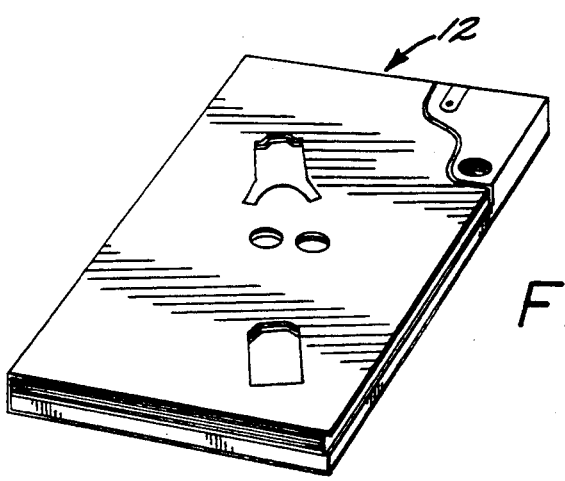
FIG. 19 illustrates an assembled book according to the invention.

FIGS. 17-19 illustrate the sequence of assembling a book according to the invention. The book is first assembled as the sheets 14 with cut-outs in appropriate areas, the sheets bound into front and rear covers 100, 102. The assembled last page incorporating the electronics module 94 is then assembled into the book to create the complete book 12. After assembly, the electronics module under-tray 94, plastic laminate and conductive ink pattern form a large membrane switch which operates to activate the circuit board within the electronics module and create sounds which are generated to the speakers. Thereafter the bottom and inside edge of the electronics module are coated with adhesive and attached to the bottom cover 102 of the assembled book 12. The inside edge of the electronic module is attached to the inside binding of the book. As may be seen from the above description, the present invention provides for important benefits in economy and functional utility of the active pages of the book while still maintaining the benefits associated with the play pattern of which such a book is capable.

Figure 20:
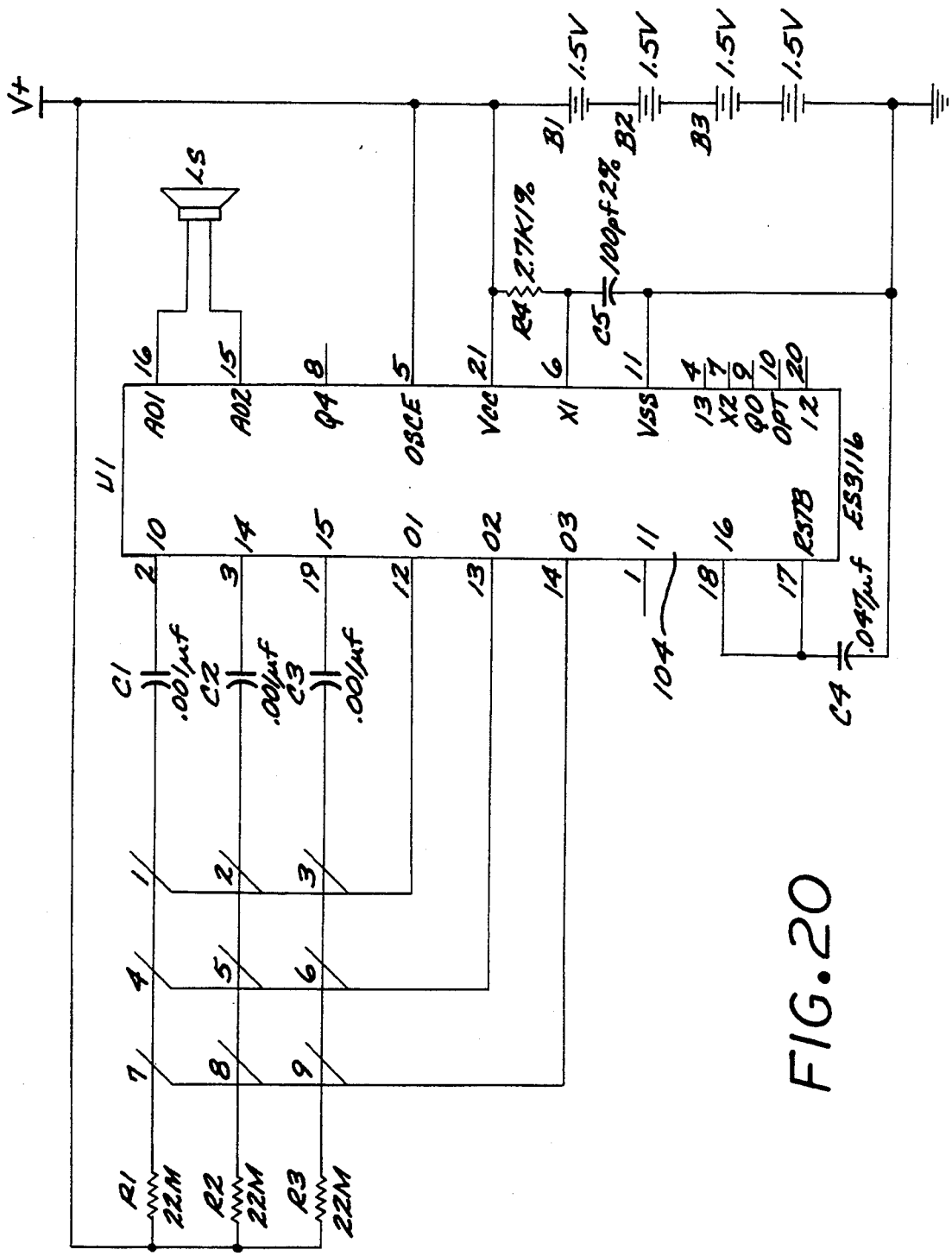
FIG. 20 is a circuit diagram for the sound synthesizer.

The sound synthesizer electronics incorporate one of a variety of speech synthesis chips known in the art, such as Electronic Speech Systems ES 3116 or the Texas Instrument's 50C11 integrated circuits. The speech synthesis chip is incorporated into a circuit which has been configured to avoid unnecessary battery drain and accidental actuation, thus enhancing the shelf life and operational life of the book for one set of batteries. The circuit used for the system is illustrated in FIG. 20. As may be seen from this figure, the circuit incorporates speech synthesizer chip 104 which is conductively connected to switches 1-9 corresponding to the various graphic depictions in the book. The chip is normally "asleep", drawing extremely low current. The chip is "awakened" when the resistance of one of the input lines is pulled down by the closing of the relevant contacts. The chip "wakes up" by starting the associated oscillator and then scans the input lines by raising sequentially Q1, then Q2 then Q3 and reads the inputs of I0, I4, I5 etc. to determine which switch is closed. After the closed switch is determined the appropriate sound is synthesized, amplified and played through the speaker. In order to prevent continuous play in response to pressing of the graphic depiction, capacitors C1-C3 are used to decouple the inputs from the chip after a single polling in combination with resistors R1-R3, which pull up the signal after polling, thereby equalizing the voltage and assuring that the chip stays "asleep" after a single actuation of a switch.

From the above, it will be clear that the present invention provides a substantial improvement on existing audio visual books and the like and allows for the incorporation of stories with suspenseful or complex plots without revealing the nature of the suspenseful portions to the reader upon first examination. All of this is accomplished in a simple, robust and attractive package which may be sized to approximately resemble a conventional book. While a particular form of the invention has been illustrated and described, it will also be apparent that various modifications can be made without departing from the spirit and scope of the invention. Accordingly, it is not intended that the invention be limited except by the appended claims.

We claim:

1. A book including a plurality of pages hinged at one side and a last page;
    at least one of said first pages having a void and corresponding text thereon;
    at least one subsequent page having a character in registration with a previous page and corresponding text thereon;
    said characters each having a switch incorporated therein;
    a sound synthesizer, an electronic amplifier and speaker incorporated with said last page;
    said switches being connected to said sound synthesizer, amplifier and speaker, thereby causing a sound to be emitted representing said character upon the actuation of said switch in said character; and
    each page having distinct characterization in position where they are progessively revealed by the story line as the book is read, said characters and text progessively revealing a story as said pages are turned.

* * * * *

UNITED STATES PATENT AND TRADEMARK OFFICE
CERTIFICATE OF CORRECTION

PATENT NO. : 5,356,296

DATED : October 18, 1994

INVENTOR(S) : Harold D. Pierce, Basil J. Scafidi, Bennie L. Garcia

It is certified that error appears in the above-identified patent and that said Letters Patent is hereby corrected as shown below:

Column 4, Line 36, "FIGS" should be --figures--.

Column 6, Line 54, "145° - 165°" should not be bold type.

Column 6, line 61, "20" should not be bold type.

Signed and Sealed this

Twelfth Day of March, 1996

Attest:

BRUCE LEHMAN

*Attesting Officer*     *Commissioner of Patents and Trademarks*